May 12, 1925.  1,537,161
J. P. EVERETT
DIRIGIBLE ROAD LAMP
Filed Nov. 2, 1923
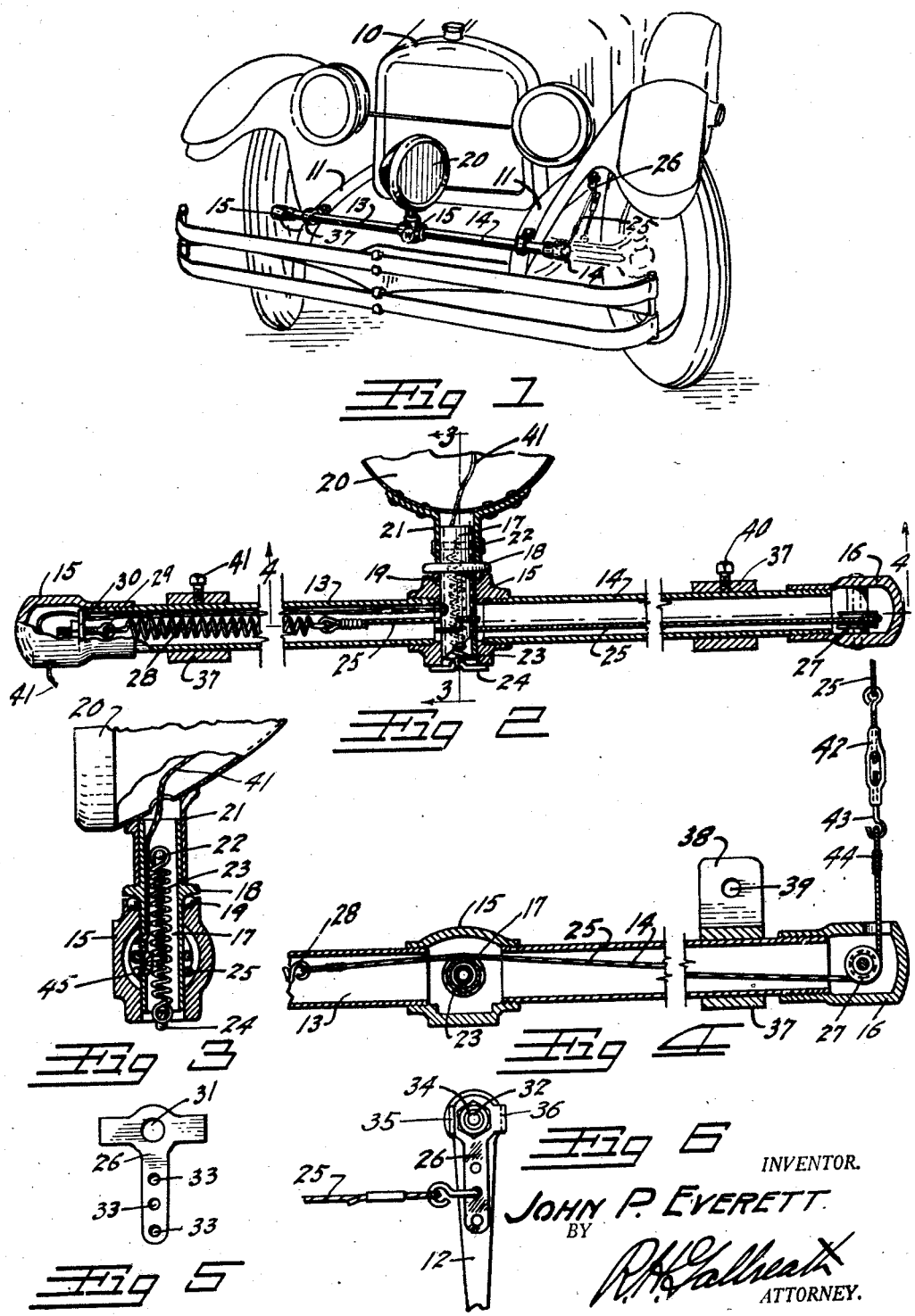
INVENTOR.
JOHN P. EVERETT.
BY
ATTORNEY.

Patented May 12, 1925.

1,537,161

UNITED STATES PATENT OFFICE.

JOHN P. EVERETT, OF DENVER, COLORADO.

DIRIGIBLE ROAD LAMP.

Application filed November 2, 1923. Serial No. 672,395.

*To all whom it may concern:*

Be it known that I, JOHN P. EVERETT, a citizen of the United States of America, residing at Denver, in the county of Denver and State of Colorado, have invented certain new and useful Improvements in Dirigible Road Lamps, of which the following is a specification.

This invention relates to dirigible headlights, and has for its principal object the provision of the device of this character in which all rigid connecting rods have been eliminated.

Another object of the invention is to provide a dirigible light, in the nature of an attachment, which can be placed upon an automobile without disturbing the present lighting equipment in any way, and which will be practically universal in its application to different makes of automobiles.

A further object of the invention is to provide a device of this character in which wearing parts have been reduced to a minimum, and in which provision is made for automatically taking up any wear which may occur.

A still further object of the invention is to provide a dirigible automobile light in which the electrical conductors to the light will be concealed.

Other objects and advantages reside in the detail construction of the invention, which result in simplicity, economy, and efficiency, and which will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the fore part of an automobile showing the invention in place.

Fig. 2 is a vertical longitudinal section through the invention.

Fig. 3 is a cross section through the lamp bearing, taken on the line 3—3, Fig. 2.

Fig. 4 is a fragmentary horizontal longitudinal section, taken on the line 4—4, Fig. 2.

Fig. 5 is a detail view of the means employed in attaching to the steering ball crank arm of the automobile.

Fig. 6 is a detail view of the steering ball crank arm with the invention attached.

Let the numeral 10 designate an automobile, the numeral 11 the forward projecting chassis members, and the numeral 12 the steering ball crank arm thereof.

The invention comprises a horizontal pipe or tube formed in two sections 13 and 14, joined in a fitting 15. The extremities of each of the sections, 13 and 14, are closed by means of ornamental caps 15 and 16, respectively.

Vertically mounted in the fitting 15, is a tubular shaft 17, provided with a collar 18, which rests upon ball bearings 19 arranged to travel in a ball race in the fitting 15. A light projector or a lamp 20 is provided with a tubular sleeve 21 which fits snugly over the upper extremity of the shaft 17 and is held in place thereon by means of a pin 22. The shaft 17 is held in place in the fitting 15 by means of a helical spring 23 which connects at its one end with the pin 22, and at the other end with a cross bar 24 which rests on the lower edge of the fitting 15.

The shaft 17 is revolved in unison with the movements of the crank arm 12 of the automobile by means of a flexible cable 25, which is connected at its one extremity, through the medium of a clip 26, to the crank arm 12. The cable 25 passes over a pulley 27, rotatably mounted in the cap 16, and thence to and half around the shaft 17 where it is passed in and out through adjacent openings in the shaft 17, as shown in Fig. 3. The said openings serve to secure the cable to the shaft. After having passed through the openings, the cable 25 continues around the shaft 17 and connects at its extremity with a horizontal helical spring 28, arranged within the tubing 13. The opposite extremity of the spring 28 is connected to an adjustable eye bolt 29 arranged in a plate 30 in the outer extremity of the tubing 13.

As shown in Fig. 5, the clip 26 comprises a T-shaped piece of sheet metal having an opening 31 for the passage of the crank arm shaft 32 of the automobile and other openings 33 which allow the length of the lever arm actuating the cable 25 to be varied at will.

In installing the clip 26, the nut 34 is removed from the crank arm shaft 32 and the opening 31 slipped thereover. The nut 34 is now tightly clamped in place and one of the T-shaped arms of the cap is bent upward, along side of the nut 34, as shown at 35, and the other of the T-shaped arms is bent downward along side of the crank arm 12, as shown at 36. The bent portions 35 and 36 not only serve to prevent the clip 26 from revolving on the shaft 32, but also serve to lock the nut 34 upon its shaft to prevent its becoming accidentally loosened.

The two sections of tubing, 13 and 14, are secured to the forward projecting members of the chassis 11 by means of collars 37 through which said tubes pass. The collars 37 are each provided with an ear 38, having an opening 39 through which a bolt is passed into the chassis members 11. Set screws 40 are provided in the collars 37 to prevent the tubes 13 and 14 from revolving therein.

The electric feed wire 41 of the lamp 20 is passed downward within the tubular shaft 17 and through an opening therein into the tube 14 emerging through an opening in the cap 15.

The operation of the device is as follows:

As the wheels of the automobile are turned toward the left as shown in Fig. 1, the crank arm 12 will travel forward, thereby loosening the tension in the cable 25, and allowing the spring 28 to revolve the shaft 17 and point the lamp 20 to the left. As the wheels are turned to the right, the crank arm 12 travels rearward, thereby pulling the cable 25 against the tension of the spring 28, and turning the lamp 20 to point to the right.

It will be noted that the means for revolving the light in this invention are entirely flexible, and that all vibration is absorbed by the spring 28, so that it cannot result in loosening the operating mechanism of the device. It will also be noted that there is absolutely no lost motion between the steering mechanism and the lamp 20, since the inter-connected parts are constantly kept tight by the tension of the spring 28. The lamp 20 will, therefore, always immediately register any movement of the steering mechanism.

The cable 25 constantly pulls with equal intensity from opposite sides of the shaft 17 which eliminates any side wear on the shaft or its bearing. There are only two points of friction in the entire device. One under the collar 18, and one at the pulley 27. The collar 18 being supported upon ball bearings, the friction at this point is practically eliminated.

A turn buckle 42 is placed in the cable 25, and it is by means of this turn buckle and the adjustable eye bolt 29 that the angle of projection of the lamp 20 is adjusted so that it will project along the axis of the automobile, when the wheels thereof are turned straight ahead. The turn buckle 42 is provided at one end with a hook 43, engaging a loop 44 in the cable 25. Should it be desired for any reason to disconnect the operating mechanism, the loop 44 is removed from the hook 43.

The distance from the crank arm 12 to the position of the cross tubes 13 and 14 varies in different automobiles. The length of the cable 25 can be readily adjusted to suit this variation by the turnbuckle. The angle of throw of the crank arms 12 of various automobiles also varies. This variation is automatically accommodated by the spring 28. The distance between the chassis members also varies on different automobiles and the collars 37 can be adjusted on the tubes 13 and 14 the proper distance. These adjustments make the invention practically universal and make it unnecessary to have a variety of devices.

If desired a flat belt may be used in the place of the cable 25.

While a specific form of the improvement has been described and illustrated herein, it is desired to be understood that the same may be varied, within the scope of the appended claims, without departing from the spirit of the invention.

Having thus described the invention, what I claim and desire to secure by Letters Patent is:—

1. A dirigible headlight comprising a horizontal tube, arranged to be secured to an automobile; a vertical lamp supporting shaft rotatably mounted on said tube; a spring arranged in and secured to one extremity of said tube and a cable secured to said spring and surrounding said shaft and extending to connection with the steering mechanism of said automobile, said connection acting to rotate said shaft in one direction, said spring acting to rotate said shaft in the opposite direction.

2. A dirigible headlight comprising a horizontal tube, arranged to be secured to an automobile; a vertical lamp supporting shaft rotatably mounted on said tube; a spring arranged in and rigidly secured to one extremity of said tube; a lever arm arranged to be secured to the steering ball crank-arm of said automobile and flexible means connecting said spring with said lever arm, said flexible means being operatively connected to said shaft, said lever acting to rotate said shaft in one direction and said spring acting to rotate it in the opposite direction.

3. A dirigible lamp for automobiles comprising a hollow horizontal member arranged to be secured to said automobile and support a vertical bearing; a vertical lamp supporting shaft journaled in said bearing and means within said hollow horizontal member for rotating said shaft in unison with the movements of the steering mechanism of the automobile, said means comprising a cable communicating with the steering mechanism and entering one extremity of said horizontal member, said cable being operatively connected to said shaft and a spring tensioned between the extremity of said cable and the other extremity of said horizontal member.

In testimony whereof, I affix my signature.

JOHN P. EVERETT.